United States Patent [19]

Brown et al.

[11] 4,417,378
[45] Nov. 29, 1983

[54] APPARATUS FOR APPLYING HEAT SHRINKABLE TUBING

[75] Inventors: Christopher K. Brown, Camp Hill; Willard L. Busler; Donald A. Wion, both of Harrisburg, all of Pa.

[73] Assignee: AMP Incorporated, Harrisburg, Pa.

[21] Appl. No.: 239,968

[22] Filed: Mar. 3, 1981

[51] Int. Cl.³ ............................................. H01R 43/00
[52] U.S. Cl. ..................................... 29/33 M; 83/54; 83/150; 29/447; 29/564.6; 29/759
[58] Field of Search .............. 29/33 M, 447, 742, 745, 29/747, 748, 753, 759, 546.6; 83/54, 150, 183, 277; 264/342; 34/21, 105

[56] References Cited

U.S. PATENT DOCUMENTS

| | | | |
|---|---|---|---|
| 3,537,167 | 11/1970 | Lawson | 29/203 |
| 3,812,568 | 5/1974 | Nemeth et al. | 29/745 |
| 3,961,911 | 6/1976 | Ericksen | 29/564.6 |
| 4,028,459 | 6/1977 | LaJovic | 264/342 R |
| 4,239,485 | 12/1980 | Marshall | 432/121 |

Primary Examiner—Z. R. Bilinsky
Attorney, Agent, or Firm—F. Brice Faller

[57] ABSTRACT

Apparatus draws a continuous length of shrink tubing from a reel, cuts off a section, and advances it onto the terminated end of a lead carried by an adjacent conveyor. This is accomplished by shear blades integral with jaws which close on the end of the tubing to sever a section and contain it and shape it between the jaws. The jaws move vertically in a plate which is then advanced horizontally toward the lead. A feed clamp which descends with the jaws draws the continuous length forward then releases vertically as the jaws depart and a stationary clamp grips the tubing while the jaws and clamp return over the tubing for the next shearing and advance operation. Above motions are effected by levers and a slide driven by followers riding in cam grooves on discs carried by a single shaft. The end of the lead with tubing section thereon is transported laterally through a hot air duct type heater having slotted walls which permit passage of the lead therethrough.

6 Claims, 21 Drawing Figures

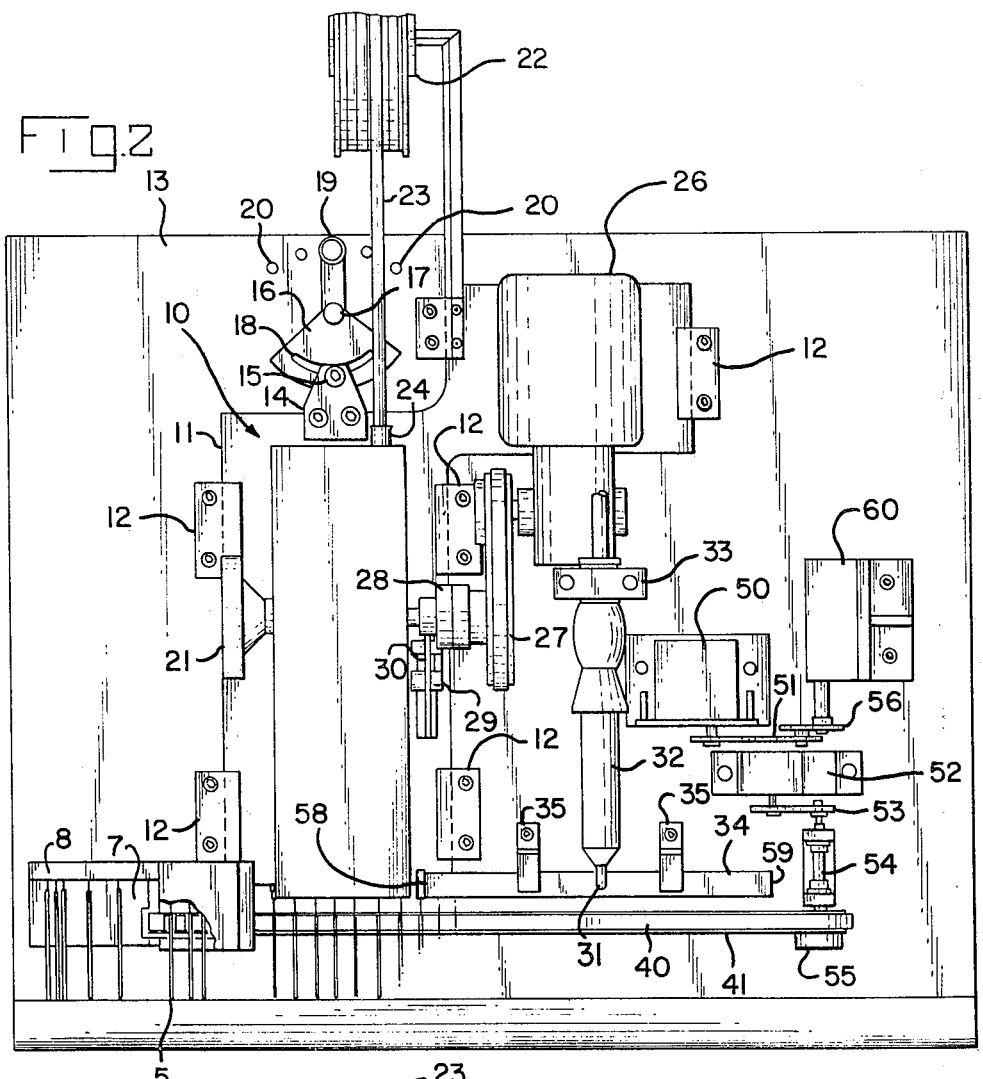
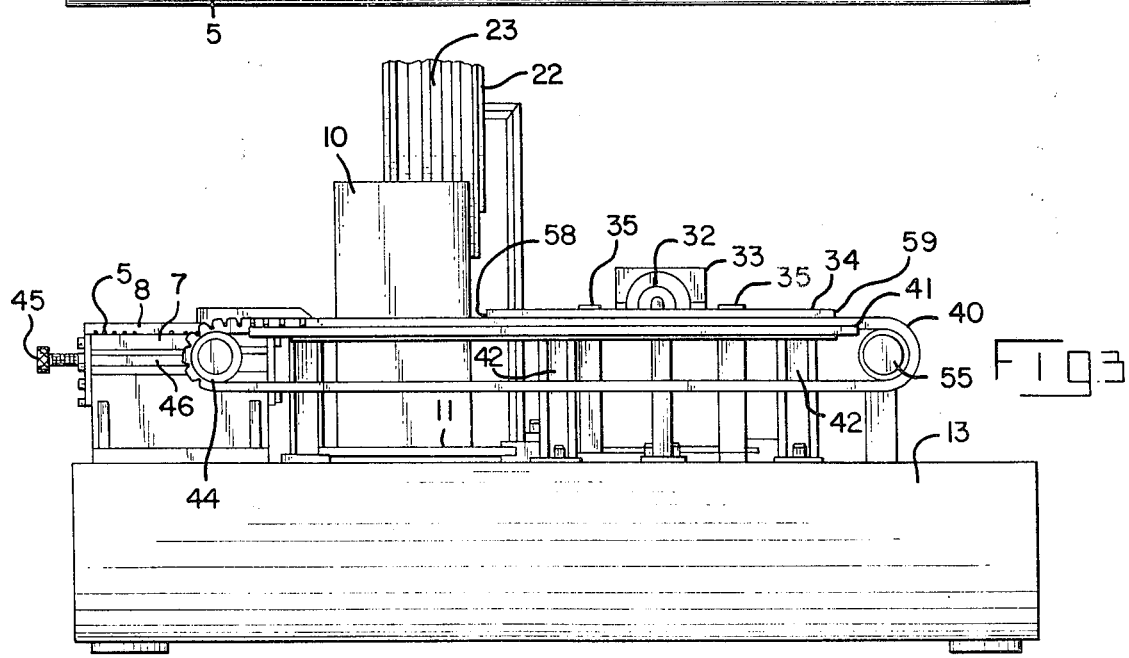

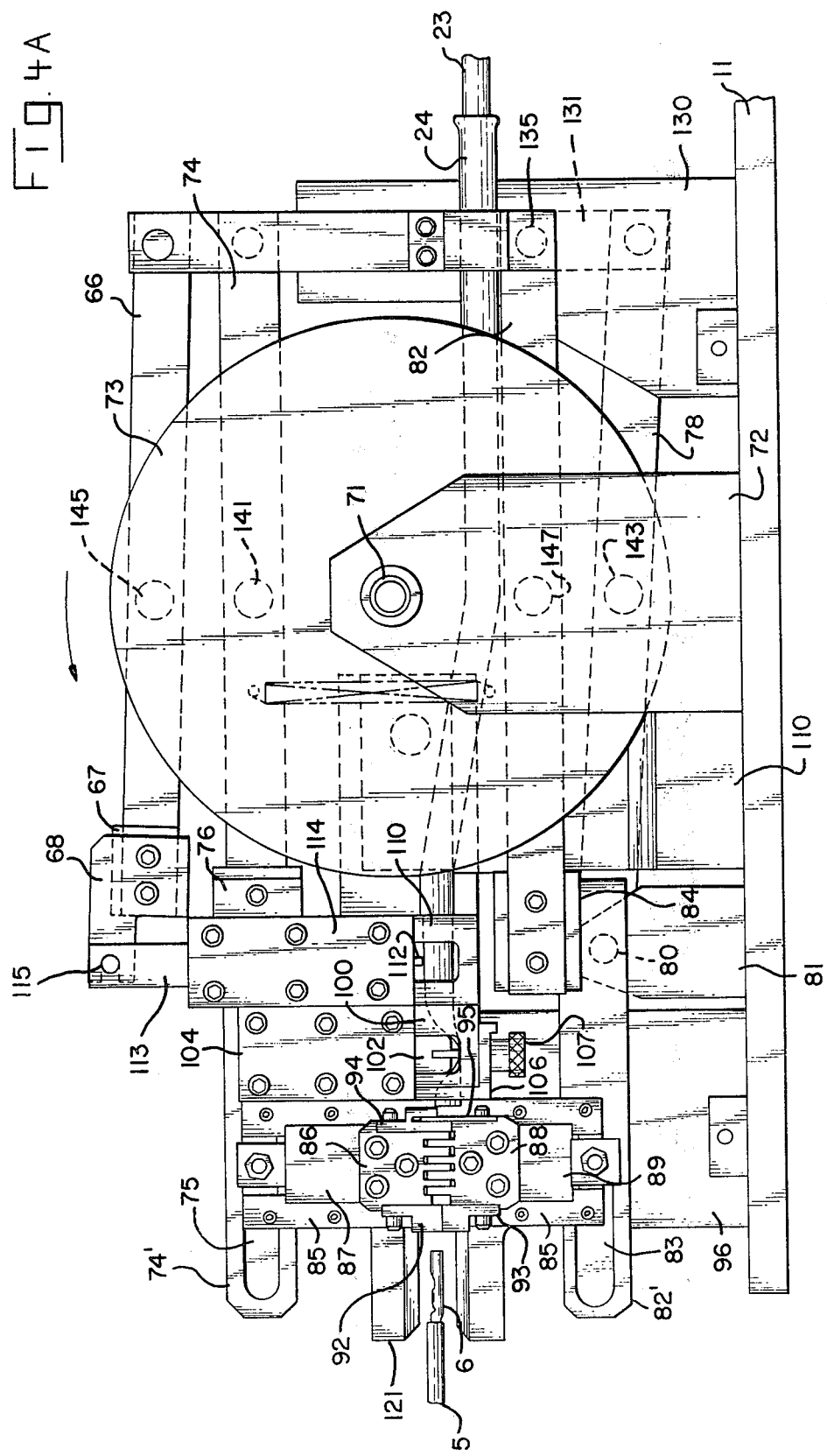

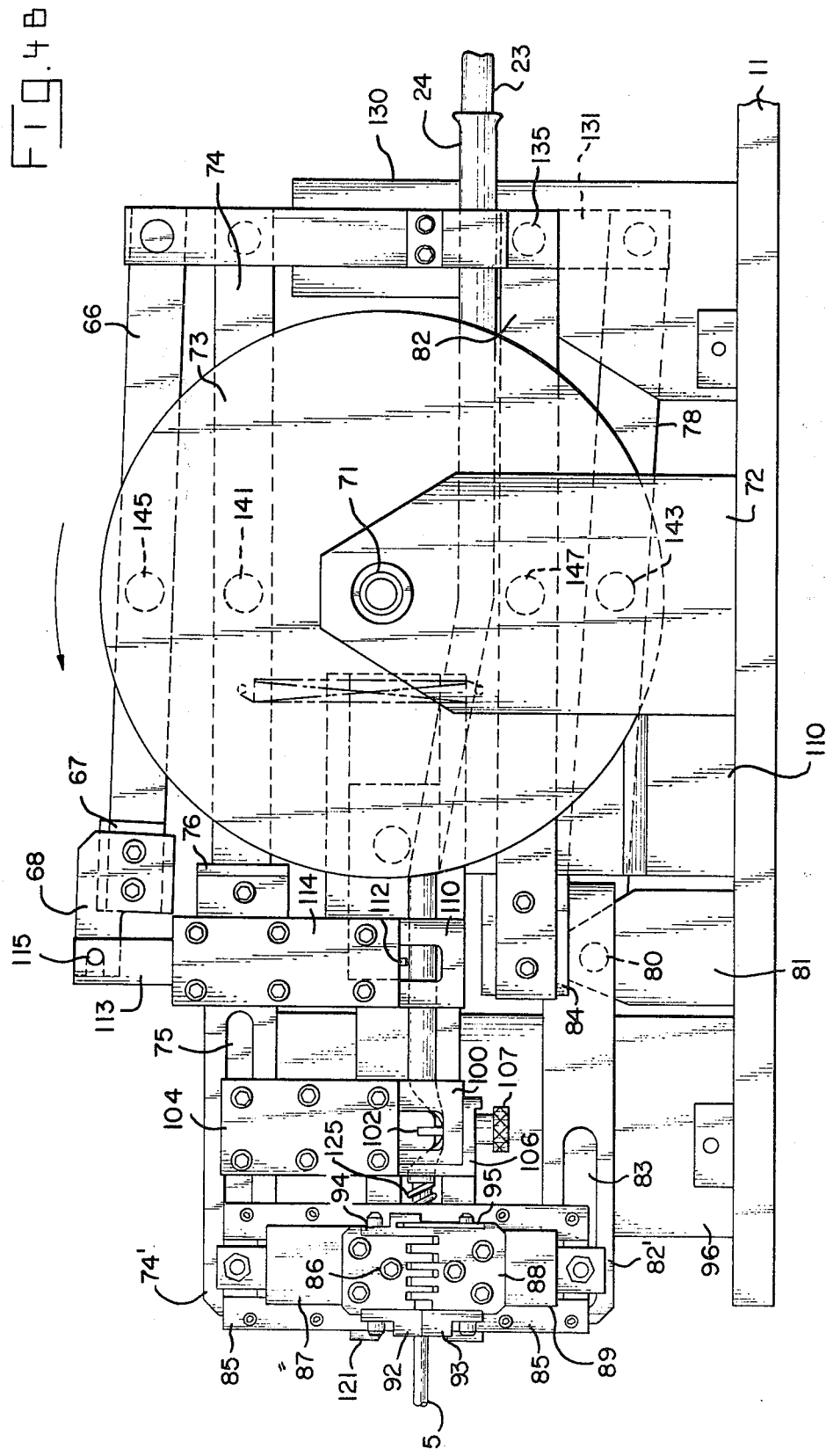

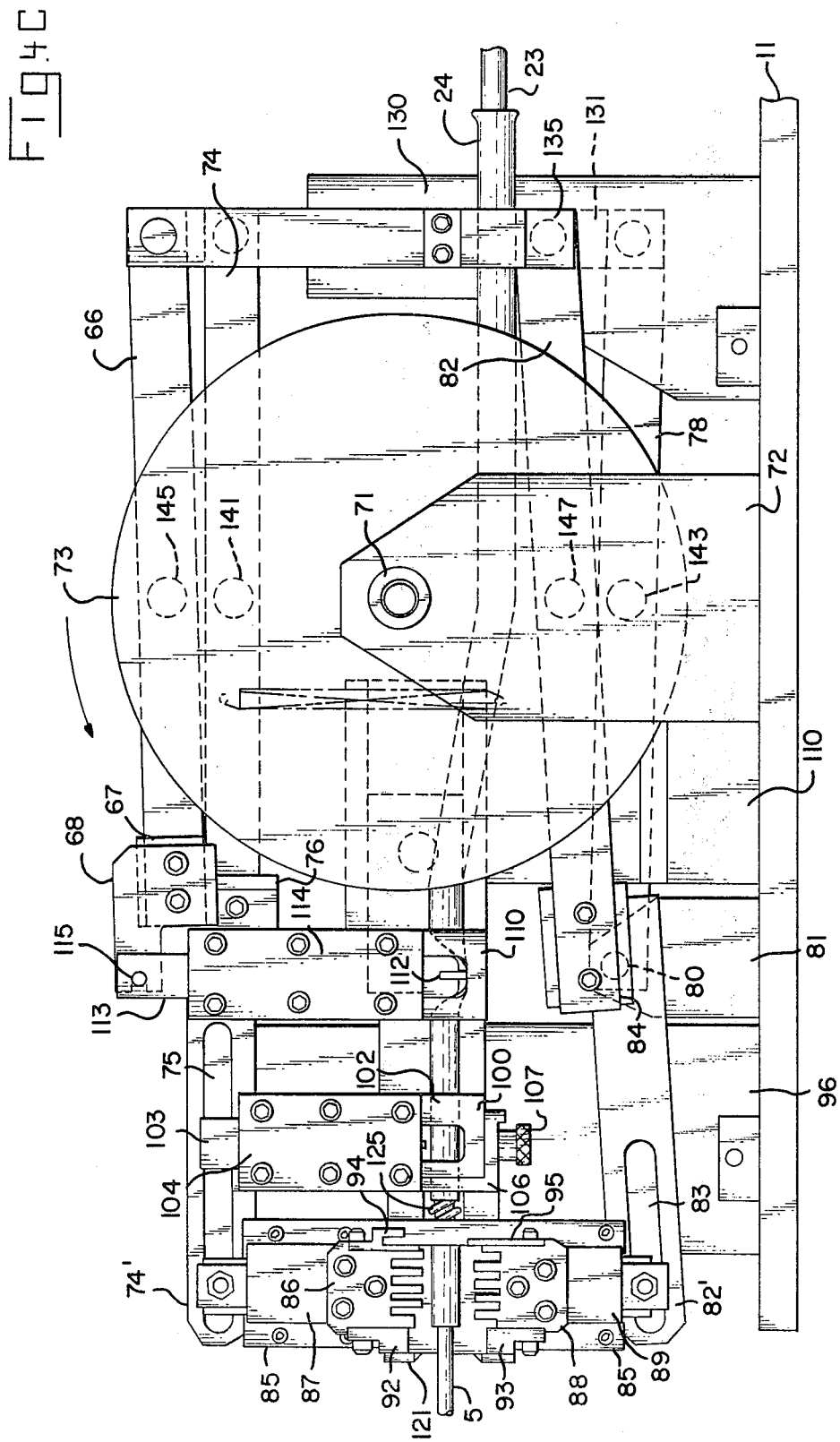

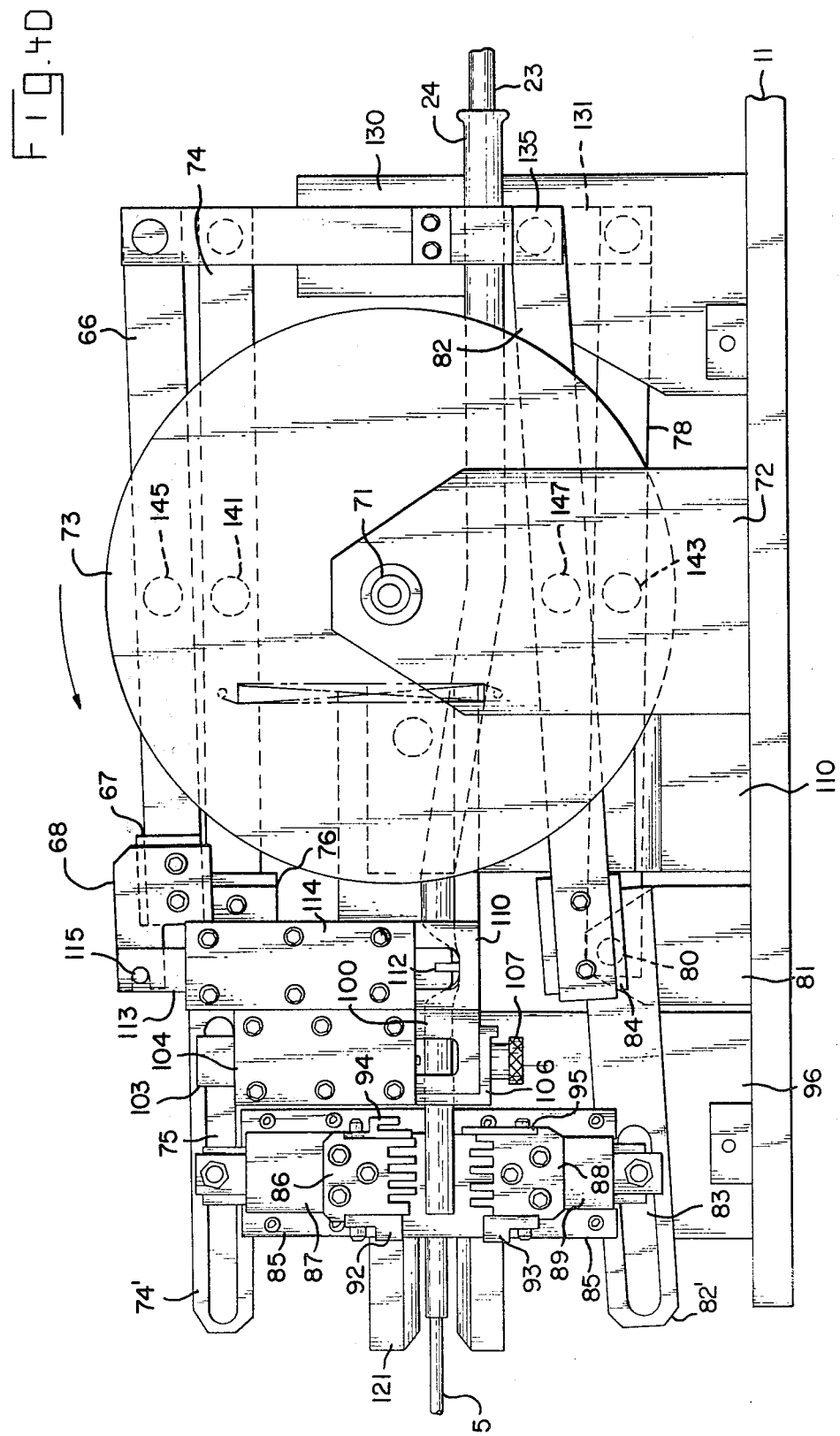

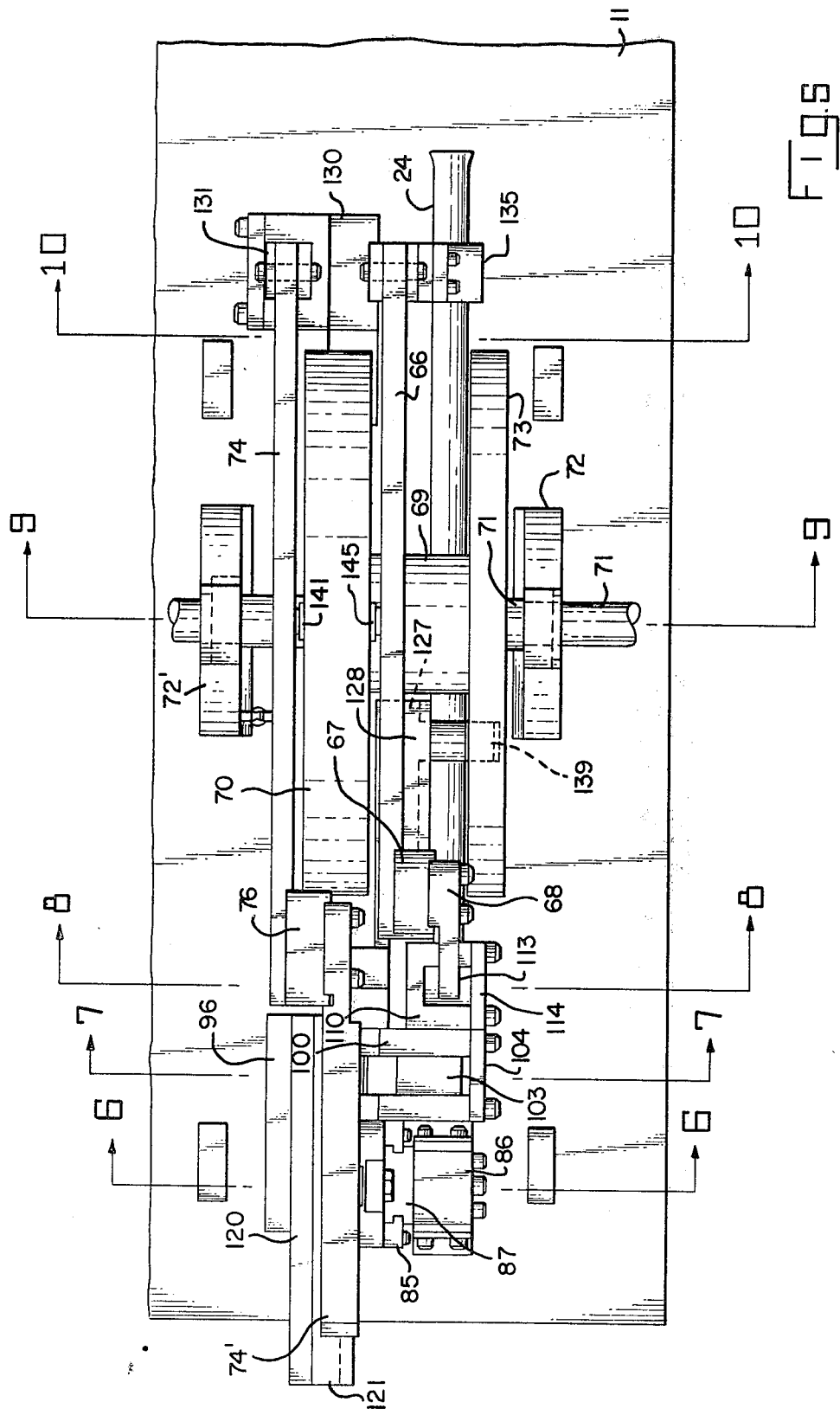

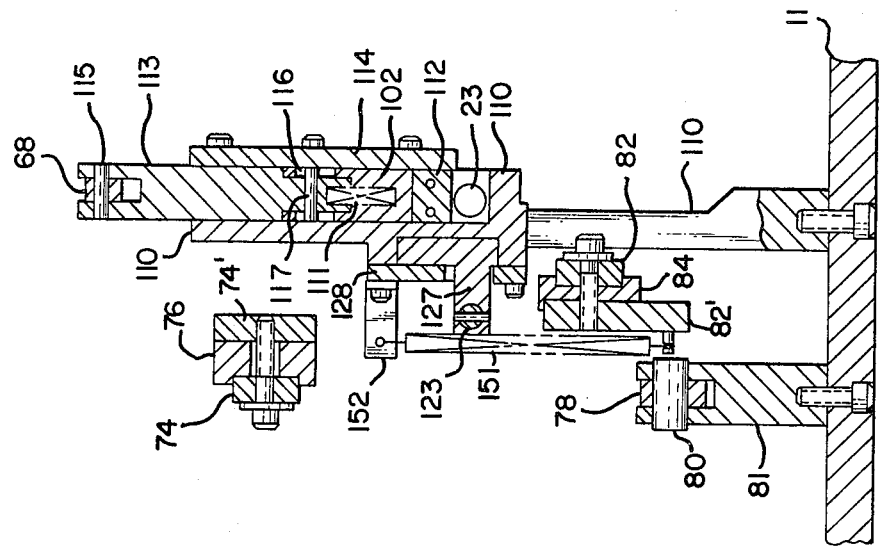
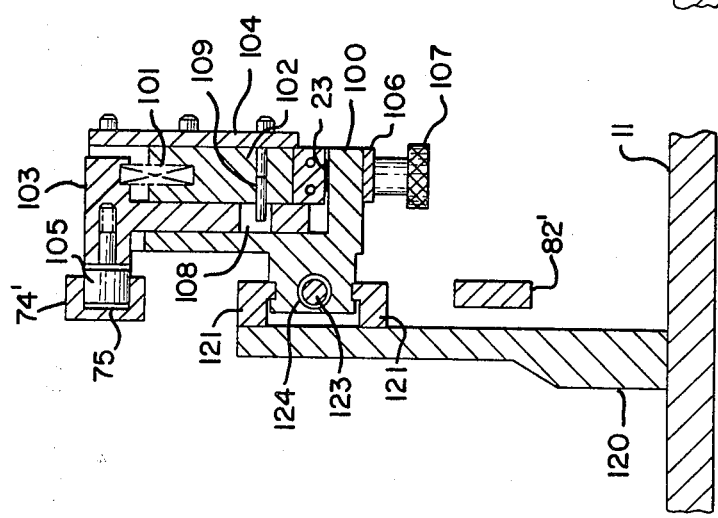
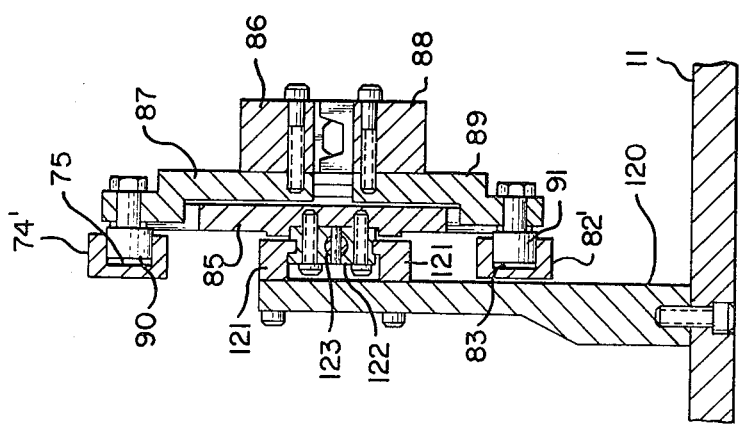

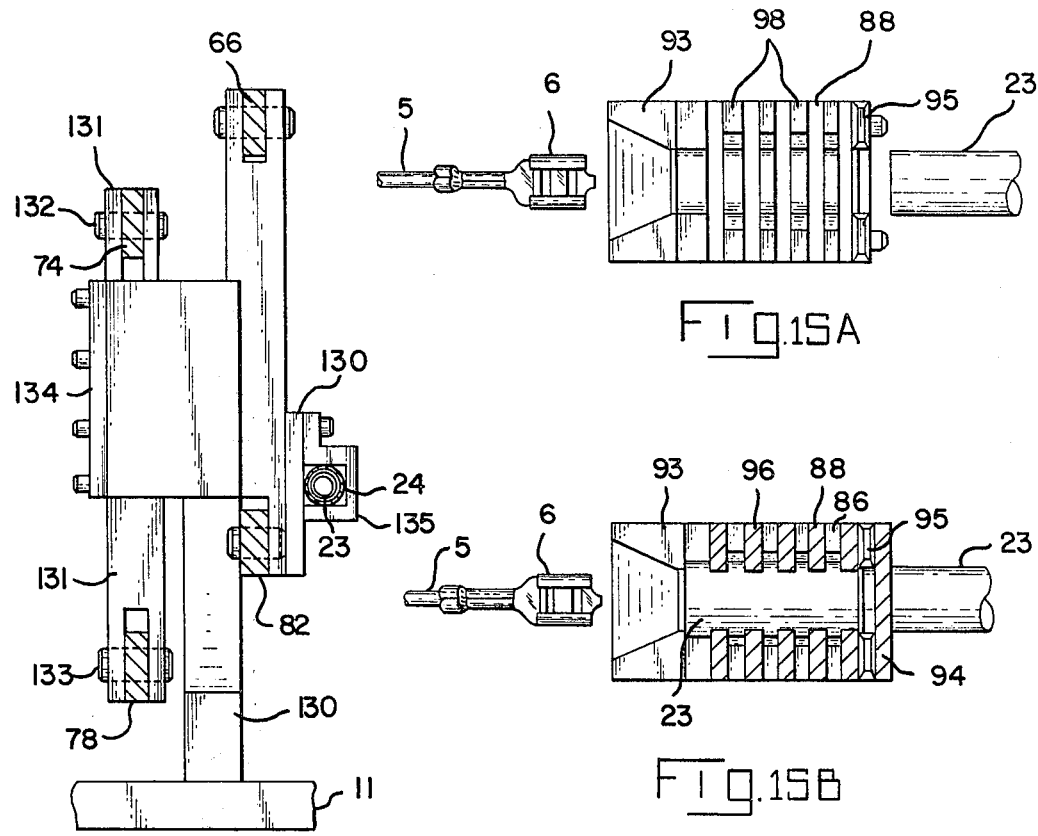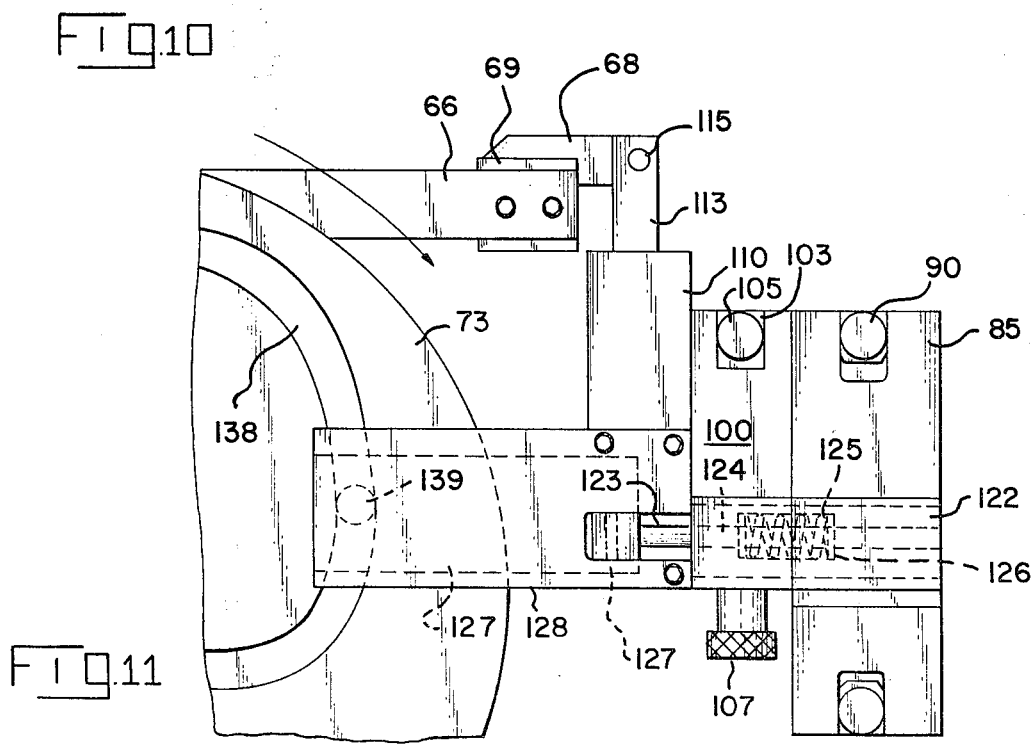

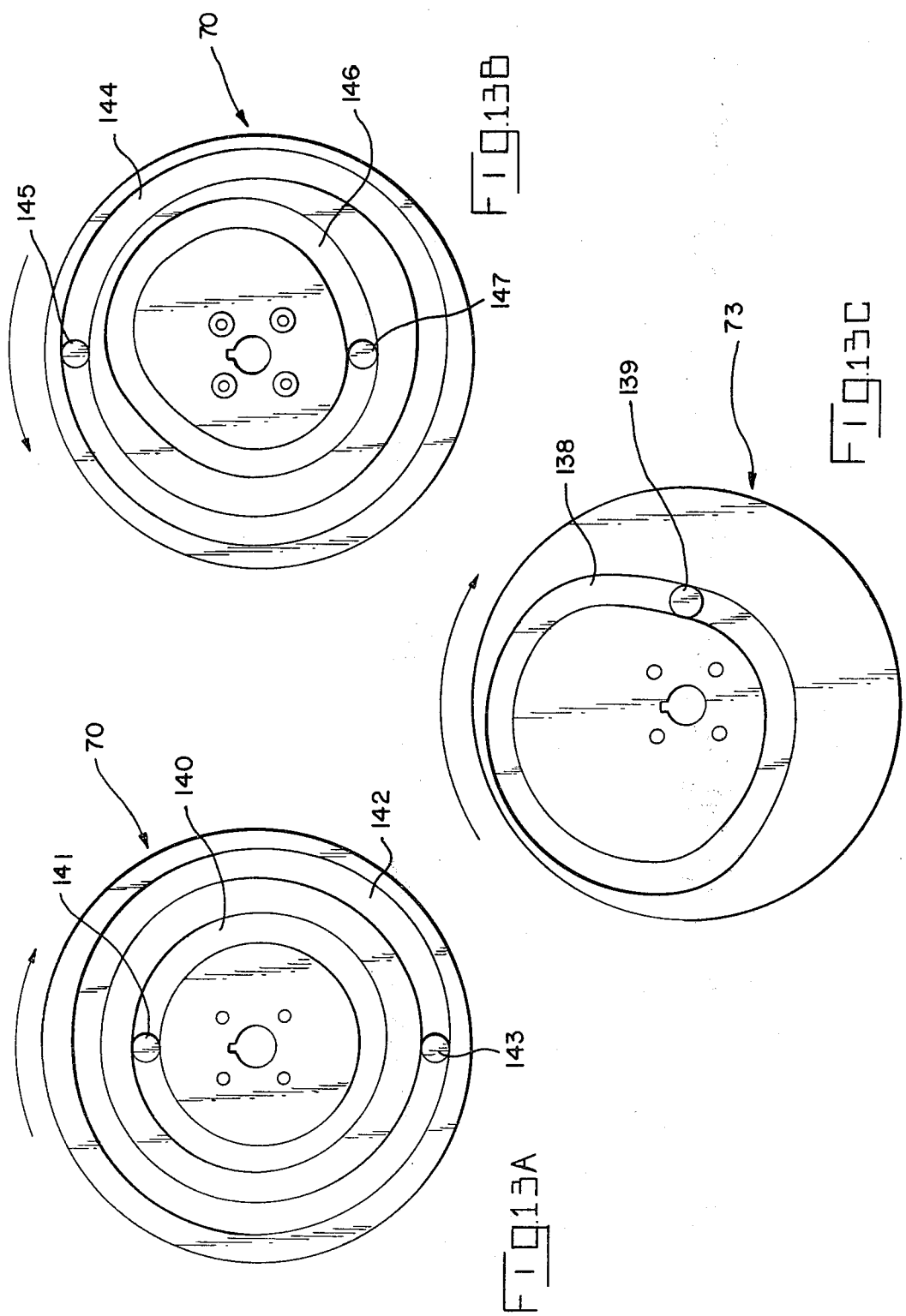

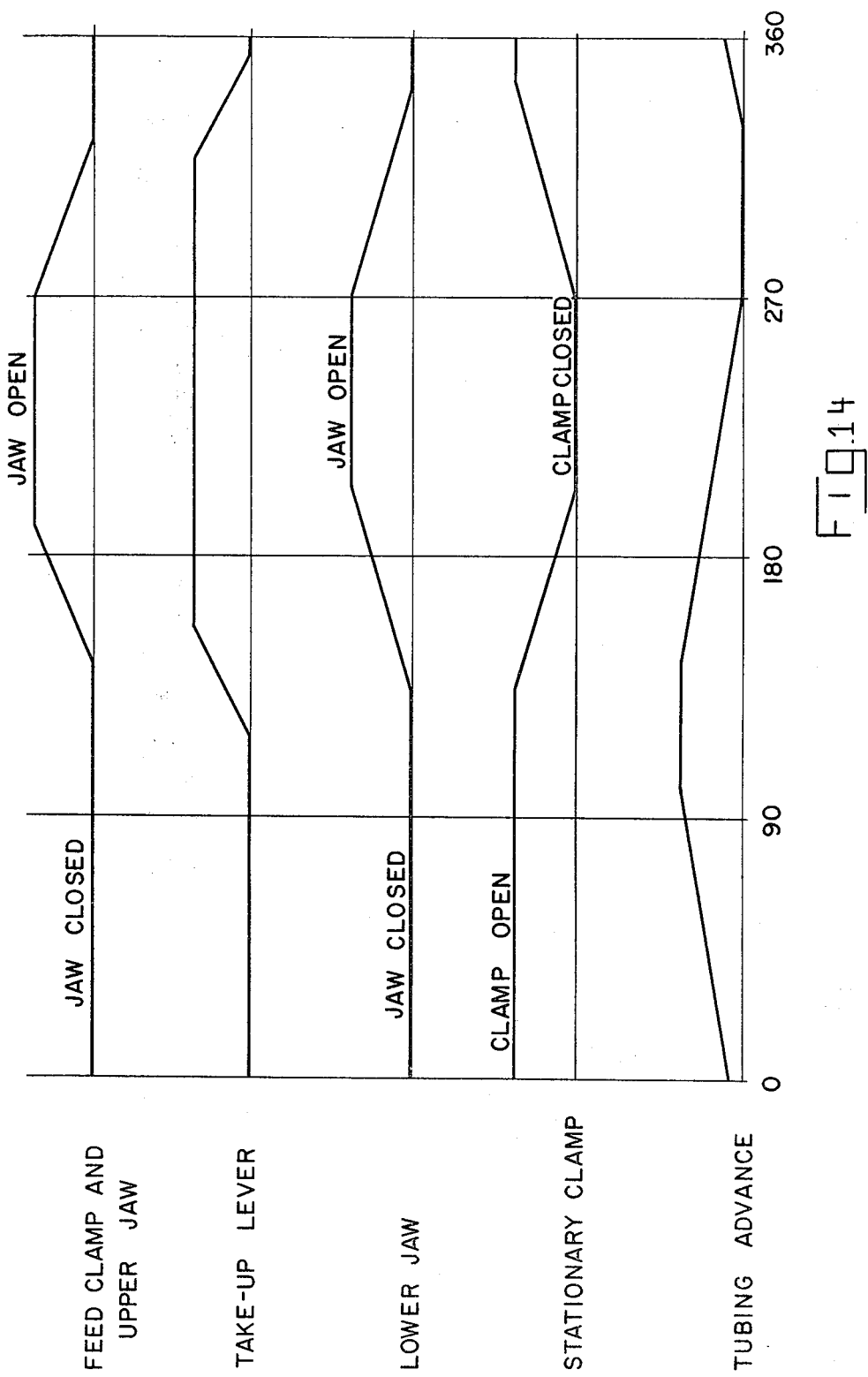

APPARATUS FOR APPLYING HEAT SHRINKABLE TUBING

BACKGROUND OF THE INVENTION

This invention relates to a tubing applicator for placing tubing sections onto wire leads, and more specifically to an apparatus which shears tubing sections from a continuous reel, shapes the tubing, and precisely positions it onto the terminated end of a wire lead which is carried by a conveyor.

The use of heat shrinkable tubing to protect electrical connections is well known. Shrink tubing is a plastic material which is expanded under controlled conditions and shrinks back to its original shape when exposed to heat. Thus tubing slightly larger than the connection to be encapsulated is placed thereon, then exposed to heat to shrink the tubing around the connection and adjacent portions of wire to insulate the connection. While insulating connections has been found to be desirable, as a hand procedure it is quite time consuming and adds considerably to the labor costs of products having shrink tubing insulation. Further, repeated precise placement of tubing sections on connections is difficult as a manual task.

U.S. Pat. No. 3,812,568 discloses an apparatus which delivers pieces of precut shrink tubing to a waiting position adjacent an operator where a lead is inserted and a lateral conveyor picks up the assembly and transports it to a heater for shrinking. The tubing section is transported to the waiting position between conveyors driven in opposite directions which converge to compress the section into an oval shape for snug fit onto a flat connector. The assembly then passes an adjustable stop parallel to the conveyor which positions the section relative to the terminal to establish the desired alignment between the tubing section and the connector prior to heating.

U.S. Pat. No. 4,239,485 discloses an apparatus which delivers sections of shrink tubing supplied on a tape to a control station for insertion of a terminal. A conductor is positioned through the sleeve then gripped by jaws which carry it through a hot air heater for shrinking.

SUMMARY OF THE INVENTION

It is a primary object of the present invention to deliver a continuous length of tubing into an apparatus which shears off a section of shrink tubing and advances it onto a pre-positioned terminated end of a wire lead. The only manual operation is the placement of the lead onto a conveyor which carries it to the applicator station where the tubing section is positioned on the terminated end. Means are provided for assuring axial positioning of the lead relative to the belt, and the applicator is adjustable to position the section relative to the lead as desired. An additional object of the invention is to deform the section of tubing into an oval shape so that it can be inserted onto the terminal in a snug fit. Another object is to provide an apparatus for application of shrink tubing which can be used with leads conveyed by a conveyor belt, so that the leads may be terminated prior to tubing application and heated subsequently thereto to shrink the tubing sections on the terminated end. Another major object achieved by the invention is provision of an apparatus more compact, simple, and economical of manufacture than the solutions present in the prior art.

These and other objects are accomplished by an apparatus having a single drive means which turns a shaft for one full revolution, intermittently, for each shearing and tubing advance operation. The shaft carries two discs having cam grooves profiled in the surfaces thereof which impart horizontal and vertical movement to clamps, shears, and tubing containment jaws by means of followers, levers, and slides.

Accomplishment of the foregoing objects and structural details of the apparatus will be apparent from examination of the drawings and description which follows.

BRIEF DESCRIPTION OF THE DRAWINGS

FIG. 2 is a plan view of the tubing applicator and heating apparatus.

FIG. 3 is an elevation of the tubing applicator and heating apparatus.

FIG. 4A et seq are side views of the applicator showing sequential steps in the operation.

FIG. 5 is a plan view of the applicator.

FIG. 6 is a section of the jaws, taken along line 6—6 of FIG. 5.

FIG. 7 is a section of the feed clamp, taken along line 7—7 of FIG. 5.

FIG. 8 is a section of the stationary clamp, taken along line 8—8 of FIG. 5.

FIG. 10 is a section showing the lever mounting block, taken along line 10—10 of FIG. 5.

FIG. 11 is a section showing the tubing advance mechanism, taken along line 11—11 of FIG. 5.

FIGS. 13A, 13B, 13C are plan views of the cam grooves.

FIG. 14 is a timing diagram.

FIG. 15A is a plan view of the lower jaw.

FIG. 15B is a section view taken through the upper jaw as engaged to the lower jaw with a section of tubing.

DETAILED DESCRIPTION OF THE PREFERRED EMBODIMENT

In the description which follows, the operation of the system as a whole will be described before detailing the structure and operation of the component apparatus.

Figure 1:
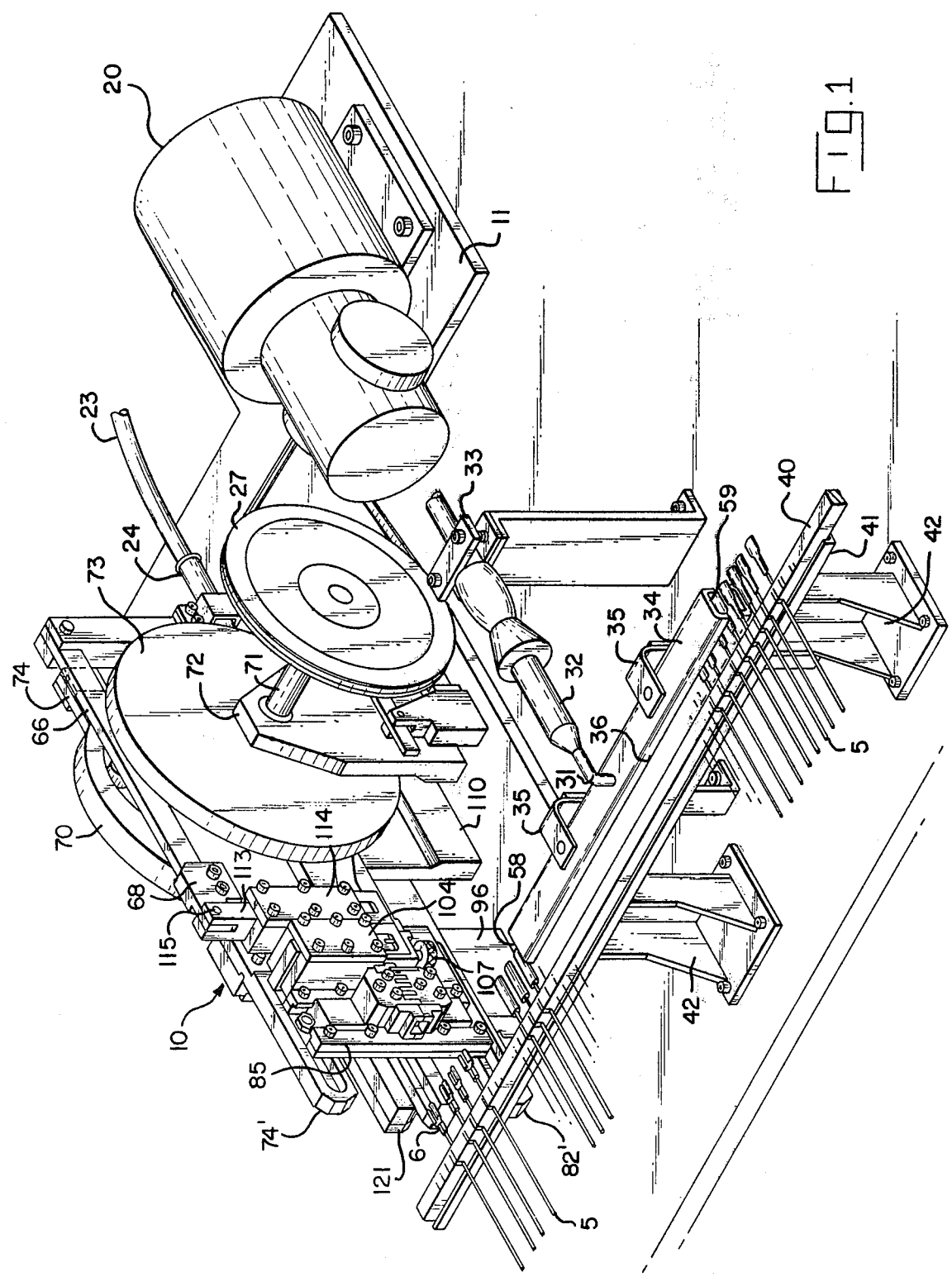
FIG. 1 is a perspective of the tubing applicator and heating apparatus.

FIG. 1 is a perspective of the apparatus in bench form, which includes a tubing applicator 10 and heater 32 for shrinking tubing sections onto the terminated ends of wire leads. Wire leads 5 are manually placed in wire receiving slots in conveyor 40, which carries the leads past applicator 10 where it stops to have shrink tubing positioned on the terminated end before transporting the leads laterally through hot air duct 34 to shrink the tubing. The belt is resilient material such as rubber having wire receiving slots of the type disclosed in U.S. Pat. No. 3,804,603, which is hereby incorporated by reference.

FIG. 2 is a plan view of the apparatus, which particularly shows drive means for various components. Gear motor 26 drives belt 27 which drives the applicator 10 through clutch 28. The clutch 28 is activated by solenoid 29 and clutch release bar 30. The applicator 10 may also by cycled manually be handwheel 21. The applicator 10, motor 26, and associated drive linkage are mounted to applicator base 11 which is in turn mounted to base 13 by gibs 12. The gibs 12 permit adjusting the position of the applicator 10 relative to belt 40, so that shrink tubing may be positioned as desired relative to the terminals 9 on the wire leads 5. The leads 5 are positioned as desired relative to the conveyor 40 by positioning the leads on the surface 7 so that the terminated end is against fence 8, as described in U.S. Pat. No. 3,804,603. Tube depth adjustment cam 16 provides for fine adjustment of the applicator position. The cam 16 is pivoted about pivot screw 17 so that pin 15, which is fixed relative to applicator 10 by guide block 14, rides through arcuate slot 18. Slot 18 is of variable radius so that applicator base 11 thus moves relative to belt 40. Spring plunger 19 on cam 16 locks into any of holes 20 in base 13 to fix the position of the base 11. Shrink tubing 23 is drawn into tubing feed tube 24 on applicator 10 from reel 22 mounted on base 13.

Referring still to FIG. 2, belt 40 is situated to transport leads with tubing sections 6 on the terminated ends thereof from applicator 10 laterally with the ends passing through duct 34, which is mounted to base 13 by duct supports 35. Hot air is supplied to duct 35 by heater 32, which is mounted to base 13 by heater support 33. Motor 50 drives belt 40 through chain 51, indexer 52, chain 53, drive shaft 54, and belt drive sprocket 55. Chains 51 and 53 are borne by sprockets and shafts in usual fashion, with chain 51 also actuating switch 60 through chain 56. The switch 60 determines when the solenoid 29 actuating the clutch 28 on the terminal applicator 10 is engaged, as well as determining the dwell of the solenoid. The belt is operated in a continuous stepping fashion so that it stops for wiring loading and application of shrink tubing. A terminal applicator may also be provided adjacent to the path of the belt as disclosed in U.S. Pat. No. 3,804,603 between the wire loading station and the tubing applicator, with another switch provided to determine when termination occurs.

FIG. 3 is an elevation of the apparatus showing the drive sprocket 55, conveyor belt 40, belt guide track 41, and idler sprocket 44. Belt tension is controlled by adjustment screw 45, which moves sprocket slide 46 to which idler sprocket 44 is mounted.

Figure 9:
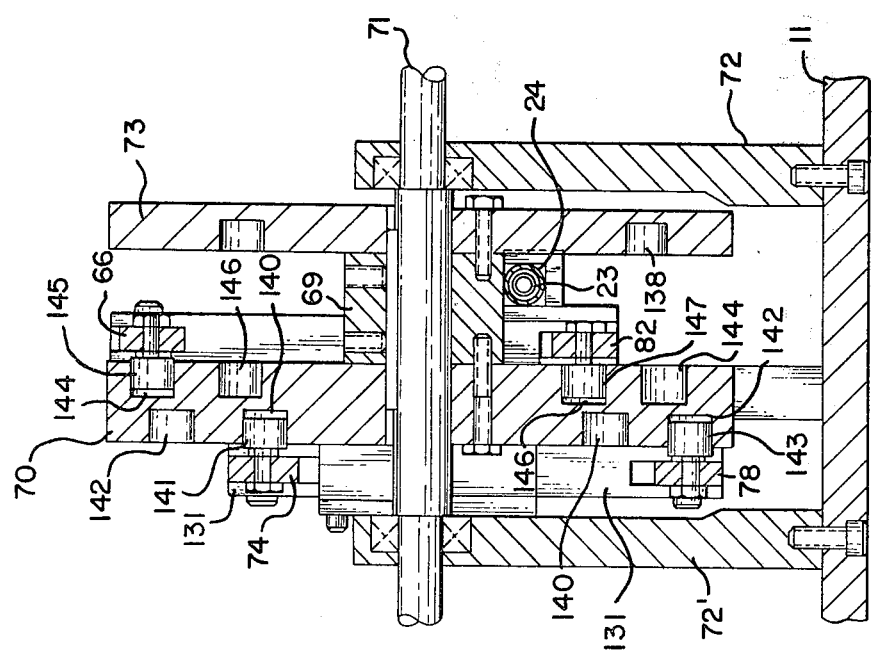
FIG. 9 is a section of the cams, taken along line 9—9 of FIG. 5.

FIG. 4A is an elevation of the tubing applicator 10, which draws tubing 23 into tubing feed tube 24, cuts off a secton of tubing, and places it on the terminated end of lead 5. The mechanical motions necessary to accomplish these operations are effected in part by upper jaw lever 74, lower jaw lever 82, stationary clamp lever 66, and take up lever 78. Each lever is pivotably mounted at one end in lever mounting block 130 as will be more readily apparent in FIG. 10. Vertical motion is imparted to components at the other end of each lever by means of cam followers 141, 143, 145, and 147 which ride in grooves in main cam 70 (shown in FIGS. 5, 9, and 13). The main cam is carried on cam shaft 71 behind advance cam 73, which acts on advance slide 127 (FIGS. 8 and 11) to impart horizontal motion to the tubing advance plate 85 and tubing feed block 100. The cam shaft 71 is journaled in supports 72, 72' and rotates counterclockwise as viewed in FIGS. 4A to 4D. FIG. 4A depicts the 0 degree position; jaws 86, 88 contain a section of shrink tubing which has been sheared by shear blade 95 cooperating with shear plate 94. Upper jaw 86 is bolted to upper jaw slide 87 while lower jaw 88 is bolted to lower jaw slide 89; the slides 86, 87 are both slideably mounted for vertical movement in tubing advance plate 85. Vertical motion is imparted to the slides 87, 89 by the action of levers 74', 82' which are extensions of levers 74, 82 respectively; lever 74' is bolted to lever 74 through adjustment plate 76 while lever 82' is bolted to lever 82 through adjustment plate 84. This appears in cross section in FIG. 8.

FIG. 6 shows the jaw assembly in the position of FIG. 4A in cross section. The slides 87, 89 carry rollers 90, 91 which ride in channels 75, 83 in levers 74', 82' respectively. This permits the slides to move with tubing advance plate 85, which is bolted to tubing advance block 122. The advance block 122 is slideably mounted in slide gibs 121 which are bolted to tubing jaw mount 120 which is bolted to applicator base 11. Note that jaws 86, 88 sandwich the tubing section contained therebetween into an oval to facilitate placement on a flat terminal. FIG. 15A shows the lower jaw 88 in plan; teeth 98 mesh with teeth 96 of the upper jaw 86 to enclose the tubing as shown in FIG. 15B. Note that the tubing is compressed so that the inside diameter of the tubing section circumscribes the inner mouth of lead-in 93; this feature prevents the terminal 9 from interfering with the tubing section as the jaws 86, 88 move forward to place the tubing on the terminal 9.

Referring again to FIG. 4A, the first or feed clamp 102 is slideably mounted in tubing feed block 100 and is retained therein by retaining plate 104 which is bolted to the feed block 100. Shaping plate 106 is held to the bottom of the feed block 100 by retaining screw 107 and serves to position the tubing for reception by jaws 86, 88 as will be described. FIG. 7 shows the feed clamp assembly in the position of FIG. 4A in cross section. Feed clamp 102 is carried by feed clamp slide 103 by means of slot 108 and pin 109, which effects lost motion between the slide 103 and clamp 107; spring 101 is positioned between slide 103 and clamp 102 so that the clamp may bear resiliently against the tubing without damaging it. Slide 103 carries a roller 105 which rides in channel 75 in lever 74' to permit motion along the same path as upper jaw slide 87. The feed block 100 is slideably mounted in gibs 121 which are fixed to tubing jaw mount 120. Advance shaft 123 passes through bore 124 in the feed block 100 to impart motion to advance block 122 as will be more apparent with reference to FIGS. 6 and 11.

Looking again at FIG. 4A, the second or stationary clamp 112 is slideably mounted in mount 110, a large machined piece which serves several mounting functions in the apparatus. The clamp 112 is carried by stationary clamp slide 113 which is retained in mount 110 by retainer 114 and carried at the top by pin 115 in clevis 68. Clevis 68 is in effect an extension of stationary clamp lever 66 and is adjustably ettached thereto through adjustment plate 67. FIG. 8 is a cross section through the stationary clamp 112 in the position of FIG. 4A. Lost motion is effected by pin 117 fixed in slide 113 which travels in slot 116 in clamp 112. Spring 111 assures resilience between the slide 113 and the clamp 112 to prevent damage to tubing 23 when the clamp descends. Mount 110 also carries advance slide 137 which is retained by cover 128. Spring clip 152 carries spring 151 which is attached at the other end to lower jaw lever 82' to take up any play. Also evident in FIG. 8 is the cross section of pivot mount 81 which carries pivot pin 80 about which takeup lever 78 pivots.

FIG. 5 is a top view of the apparatus in the position of FIG. 4A. Here the main cam 70 and advance cam 73 are apparent; the cams are bolted to hub 69 which is keyed on cam shaft 71. This is shown cross sectionally in FIG. 9; here the cam grooves and followers are apparent. Groove 140 and follower 141 control the vertical movement of the upper jaw 86 and feed clamp 102, while groove 142 and follower 143 control the movement of take up lever 78, which (through linkage apparent in FIGS. 4A to 4D and FIG. 10) assures that the upper jaw 86 and clamp 102 remain level relative to each other and move down linearly rather than arcuately. Groove 144 and follower 145 control the vertical movement of the stationary clamp 112 (FIG. 4A), while groove 146 and follower 147 control the vertical movement of lower jaw 88 (FIG. 4A). Groove 138 in advance cam 73 carries follower 139 visible only in FIGS. 4A to 4D. This rides in the forward portion of groove 138 to effect horizontal movement of the tubing advance plate 85 and tubing feed block 100 as detailed in FIG. 11.

FIG. 11 shows the forward portion of the advance cam 73 and the groove 138 which controls the tubing feed and advance mechanisms. Follower 139 is carried in advance slide 127 which has advance shaft 123 pinned in the opposite end (FIG. 8). The slide rides in a machined channel in the mount 110 and is retained therein by slide cover 128. The advance shaft 123 fits slideably through bore 124 in feed block 100 and is pinned in advance block 122 which is bolted to advance plate 85 (FIG. 6). As slide 127 moves forward, plate 85 moves relative to both block 100 and mount 110 as spring 125 expands in counterbore 126 until the slide 127 bears against feed block 100 and moves it forward with the plate 85. Thus the forward motion of the jaw assembly commences before the feed clamp 102, and the feed clamp returns before the jaw assembly.

Referring again to FIG. 5, lever mounting block 130 appears in plan. This piece serves to carry leveling slide 131 which carries upper jaw lever 74 and take up lever 78, and also pivotably carries stationary clamp lever 66 and lower jaw lever 82, as well as the feed tube clamp 135. These features appear to best advantage in FIG. 10.

The operational sequence of tubing applicator 10 will now be described in conjunction with elevation views 4A through 4D, cam groove plan views 3A through 13D, and timing diagram 14. FIG. 4A, previously described, shows the zero position. Here a section of tubing is held in the jaws 86, 88 and the feed clamp 102 grips the end of the continuous length of tubing. FIG. 4B shows the tubing advance plate 85 and feed block 100 fully forward as the cams are in the 100° position. The tubing section contained between jaws 86, 88 is positioned on the terminal at this time. FIG. 4C shows the advance plate 85 and feed block 100 still fully advanced as the cams are in the 180° position. Here the upper jaw lever 74' and lower jaw lever 82' are open, disengaging the jaws 86, 88 from the section of tubing which has been placed on the terminal and further disengaging the feed clamp 102 from the end of the tubing. Note that the stationary clamp 112 has descended as the feed clamp 102 arose so that control of the tubing position is continuous. FIG. 4D shows the advance plate 85 and feed block 100 returned as the cams are in the 270° position. Here the jaws 86, 88 are still open, but close shortly hereafter to shear another section of tubing and complete the cycle. Between 270° and 360° the conveyor moves the next lead 5 into position for placing a tubing section on the terminal as the last lead advances toward the heater duct 34 (FIGS. 1, 2, and 3).

Figure 12:
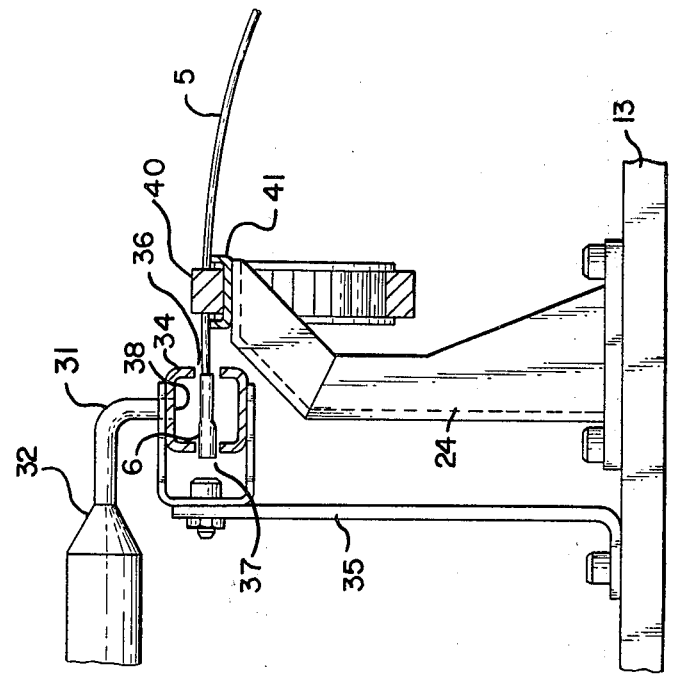
FIG. 12 is a section view of the heating apparatus, taken along line 12—12 of FIG. 4.

The heating duct 34 is shown in plan in FIG. 2, in elevation in FIG. 3, and cross sectionally in FIG. 12. Hot air is supplied to the duct by a heater 32, a unit which heats air drawn from the rear of the heater 32 and blows it into the duct 34 through an aperture 38 in the top of the duct. The conveyor 40 passes parallel to the duct and carries leads 5 so that each one extends into the first or front slot 36, and the tubing section 6 protrudes slightly beyond the second or rear slot 37. The slots 36, 37 each extend from the first end 58 of the duct (proximate to the tubing applicator) to the second end 59 of the duct (remote from the applicator) and lie in the plane of the upper run of the conveyor. Hot air thus passes into the duct through the aperture and flows out the ends 58, 59 thereof as the section of heat shrinkable tubing 6 passes therethrough, and the tubing shrinks onto the terminal.

The fact that hot air enters the duct 34 through tube 31 to a single aperture 38 located about midway between the ends 58, 59 of the duct is critical to the function of the duct. Not even a proportionate amount of air escapes through slots 36, 37; the amount of hot air passing out the slots is inconsequential. This has a very important effect; the end of the section of tubing 6 which protrudes from rear slot 37 is not heated and thus does not shrink. Thus the section 6 may be placed on the terminal with an overlapping portion (e.g. about one sixteenth inch) which will not shrink around the end of the terminal, so that a safety overlap which precludes short circuiting but does not preclude mating with a mateable terminal is provided. Note that shrink tubing may shrink longitudinally as well as radially, and different types of tubing shrink different amounts. Thus, in addition to safety overlap, additional overlap should be provided to compensate for longitudinal shrinkage. Note also, that in addition to precluding shrinkage of tubing extending beyond the terminal, the lead may be positioned so that the terminated end extends beyond rear slot 37 of the duct. This prevents tubing from shrinking around the terminal itself, so that the spring action of the terminal is not affected. In another application of the heater, a sleeve could be shrink fitted onto a splice by having the spliced lead pass through both slots. Another important effect of this design is that the lack of hot air escaping through the front slot 36 protects the rubber conveyor 40 from heat damage. After the section of tubing is shrunk onto the terminal, the lead passes out of the second end of the duct and the wire receiving slot on the conveyor releases the lead as disclosed in U.S. Pat. No. 3,804,603.

The above description is directed to the preferred embodiment and is not intended to limit the scope of the claims which follow.

What is claimed is:

1. Apparatus for applying heat shrinkable tubing to the leading end of a wire comprises:
    feed means for feeding a continuous length of tubing axially through a shear zone, said feed means comprising a feed clamp and a stationary clamp, said first clamp being arranged to clamp said tubing and advance it through said shear zone while said stationary clamp is in the open position, said stationary clamp being arranged to hold said tubing stationary while said feed clamp is in the open position and retreating over said stationary tubing,
    shear means for shearing a section of said tubing at said shear zone, said shear means comprising an upper blade and a lower blade, said blades being adapted to move together to shear said section of tubing from said continuous length of tubing, positioning means for holding said section of tubing and advancing said section to an application zone where said section is applied to the leading end of a wire, said positioning means comprising an upper jaw fixed to said upper shear blade and a lower jaw fixed to said lower shear blade, said jaws being profiled to hold said section of tubing therebetween when said jaws are in the closed position, said upper jaw and upper blade being fixed with respect to said first clamp, drive means for imparting motion to said feed means, shear means, and positioning means, said drive means comprising an upper jaw lever, a lower jaw lever, and a stationary clamp lever, each said lever having a pivot end, a component end, and a cam follower mounted therebetween, each said cam follower riding in a respective continuous groove profiled in a disc, said disc being carried by a cam shaft driven by a motor, said grooves being profiled to effect the opening and closing motions of said jaws and clamps as said shaft rotates, said upper jaw and feed clamp being carried in a slot at the component end of said upper jaw lever, said lower jaw being carried in a slot at the component end of said lower jaw lever, said jaws and first clamp being reciprocably slidable in said slots to advance said tubing through said shear zone toward said application zone, said jaws and feed clamp being reciprocated by a tubing advance shaft, said advance shaft carrying a cam follower which rides in a continuous cam groove in a disc carried by said cam shaft.

2. Apparatus for applying heat shrinkable tubing to the leading end of a wire comprises feed means for feeding a continuous length of tubing axially through a shear zone where a section of tubing is sheared from said continuous length, positioning means comprising upper and lower jaws for holding said section of tubing therebetween when said jaws are in a closed position and for advancing said section of tubing axially from said shear zone to an application zone where said section is applied to said leading end of a wire, upper shear means fixed to said upper jaw and lower shear means fixed to said lower jaw, said shear means being cooperable to shear said section of tubing at said shear zone as the jaws approach the closed position.

3. The apparatus of claim 2 wherein said feed means comprises a feed clamp and a stationary clamp, said feed clamp being arranged to clamp said tubing and advance it through said shear zone while said stationary clamp is in the open position, said stationary clamp being arranged to hold said tubing stationary while said feed clamp is in the open position and retreating from said shear zone.

4. The apparatus of claim 2 which further comprises conveyor means adjacent to said application zone adapted to grip said wire and convey it laterally of its axis, said wire being gripped so that the leading end passes through the application zone and is coaxial with said section of tubing as said leading end passes through, said conveyor means being timed to place said leading end in said application zone and pause as said section of tubing is advanced from said shear zone to said application zone, said jaws being timed to open at said application zone after said section is applied to said leading end of said wire, whereby, said leading end of said wire with said section of tubing positioned thereon may be moved laterally of its axis from said application zone when said jaws are in the open position.

5. The apparatus of claim 2 wherein said jaws are adapted to deform said length into an oval cross section to facilitate application of said length to a flat terminal on the leading end of a wire.

6. The apparatus of claim 4 which further comprises heating means downstream of said application zone and adjacent to said conveyor means, said heating means being adapted to heat said section of tubing on the leading end of said wire to shrink said tubing thereon.

* * * * *